United States Patent [19]

Tashiro et al.

[11] Patent Number: 4,837,727
[45] Date of Patent: Jun. 6, 1989

[54] ROAD SURFACE DETECTING DEVICE FOR VEHICLE

[75] Inventors: Syuzaburou Tashiro, Okazaki; Toshikazu Ina, Nagoya; Hisasi Kawai, Toyohashi, all of Japan

[73] Assignee: Nippon Soken, Inc., Nishio, Japan

[21] Appl. No.: 835,883

[22] Filed: Mar. 3, 1986

[30] Foreign Application Priority Data

Mar. 4, 1985 [JP] Japan .................................. 60-42512
May 28, 1985 [JP] Japan .................................. 60-115114

[51] Int. Cl.$^4$ ............................................. G01B 5/28
[52] U.S. Cl. ........................... 364/551.01; 364/424.05; 280/707; 73/105
[58] Field of Search ............... 364/550, 426, 551, 424, 364/565; 73/146, 105; 280/707; 33/551

[56] References Cited

U.S. PATENT DOCUMENTS

| | | | |
|---|---|---|---|
| 4,126,036 | 11/1978 | Nilan et al. | 73/105 |
| 4,422,322 | 12/1983 | Spangler | 73/105 |
| 4,506,909 | 3/1985 | Nakashima et al. | 280/707 |
| 4,651,290 | 3/1987 | Masaki et al. | 364/550 |
| 4,666,218 | 5/1987 | Masaki et al. | 364/426 |
| 4,672,547 | 6/1987 | Masaki et al. | 73/105 |

Primary Examiner—Gary Chin
Attorney, Agent, or Firm—Cushman, Darby & Cushman

[57] ABSTRACT

A road surface detecting device has a rotary sensor for detecting the passage of teeth formed in an outer surface of a circular plate at regular intervals, which is connected to an axle of a vehicle and rotates thereabout, and generates an output signal pulsing every time when said teeth pass the rotary sensor. The output signal is inputted to a microcomputer. The microcomputer calculates period variations of the pulsing output signal and an average value of a predetermined number of the period variations. When the average value is not less than a predetermined value, the road surface is determined as being in a bad condition and when the average value is less than the predetermined value, the road surface is determined as being in a good condition; when the average value is less than the predetermined value and the most recently calculating period variation is not less than a predetermined period variation, the road surface is determined as being a rough area on a good road.

18 Claims, 5 Drawing Sheets

ROAD SURFACE DETECTING DEVICE FOR VEHICLE

BACKGROUND OF THE INVENTION

1. FIELD OF THE INVENTION

The present invention relates to a road surface detecting device for detecting the condition of a road surface on which a vehicle run.

2. DESCRIPTION OF THE PRIOR ART

When a vehicle runs on good roads streets or the like, it is desirable to absorb vibrations of small amplitude caused by the road surface. Absorbing such small amplitude vibrations is effected by decreasing the damping force of a suspension of the vehicle, contrastingly when a vehicle runs on bad roads such as mountain roads, it is desirable to damp vibrations of large amplitude from the road surface. Large amplitude vibrations are absorbed by increasing the damping force of the suspension of the vehicle.

In order to automatically control the damping force of the suspension in such a manner as described above, a detecting device for detecting the condition of the road surface on which a vehicle runs is required. A device for determining the road condition in accordance with the variation of vehicle speed has been proposed for this purpose. This device is described in U.S. Pat. No. 4,506,909, and senses the acceleration of the vehicle.

Since the variation of vehicle speed accurately corresponds to the road condition, the above described device exhibits excellent performance. However, the above described device has a problem. Namely, when a vehicle passes rough areas on a good road, such as joints of a road, the variation of vehicle speed is temporarily increased. This results in the above described device erroneously determining this condition as being a bad road condition and consequently increases the damping force of a suspension of the vehicle. Consequently, the vehicle becomes uncomfortable to ride in.

SUMMARY OF THE INVENTION

One object of the present invention is to provide a road surface detecting device capable of accurately detecting the condition of a road surface.

Another object of the present invention is to provide a road surface detecting device free from erroneous determination of rough areas on good roads as the bad road condition.

The road surface detecting device for a vehicle according to one aspect of the present invention comprises speed detecting means for detecting the speed of the vehicle at regular intervals, speed variation calculating means for calculating speed variations of successively detected speeds of the vehicle, deviation calculating means for calculating a deviation of a predetermined number of the speed variations and determining means for determining the road surface as the bad condition when the deviation is not less than a predetermined deviation and determining the road surface as the good condition when the deviation is less than the predetermined deviation.

The road surface detecting device for a vehicle according to another aspect of the present invention comprises speed detecting means for detecting the speed of the vehicle at regular intervals, speed variation calculating means for calculating speed variations of successively detected speeds of the vehicle, an average value calculating means for calculating an average value of a predetermined number of the speed variations, frequency detecting means for detecting a number of times that the average value exceeds a predetermined average value in a predetermined travel distance, and determining means for determining a road surface as the bad condition when the frequency is not less than a predetermined frequency and determining a road surface as the good condition when the frequency is less than the predetermined frequency.

BRIEF DESCRIPTION OF THE DRAWINGS

FIGS. 1 to 4 illustrate a first embodiment of a road surface detecting device according to the present invention;

FIGS. 5 to 7 illustrate a second embodiment of the road surface detecting device according to the present invention;

DETAILED DESCRIPTION OF THE EMBODIMENTS

FIGS. 1 to 4 illustrate a first embodiment of a road surface detecting device according to the present invention.

Figure 1:
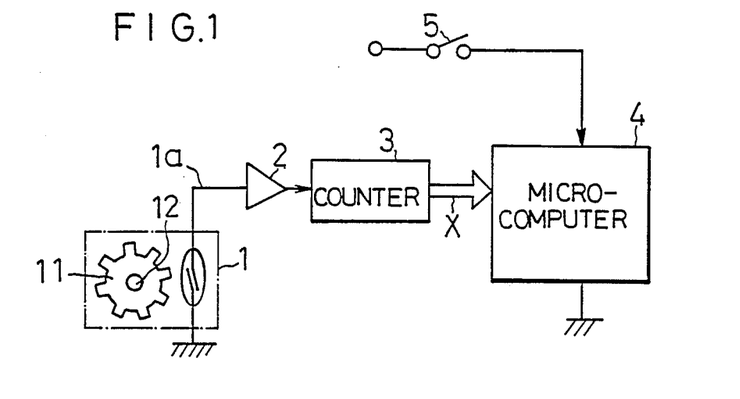
FIG. 1 is a view illustrating the hardware of the device.

FIG. 1 illustrates the hardware of the road surface detecting device according to the present invention. In FIG. 1, the reference numeral 1 designates a rotary sensor, the reference numeral 2 designates a buffer amplifier, the reference numeral 3 designates a counter, the reference numeral 4 designates a microcomputer and the reference numeral 5 designates a key switch.

The rotary sensor 1 detects the passage of teeth formed around a circular plate 11 which rotates about an axle 12 of a vehicle.

Figures 2A, 2B:
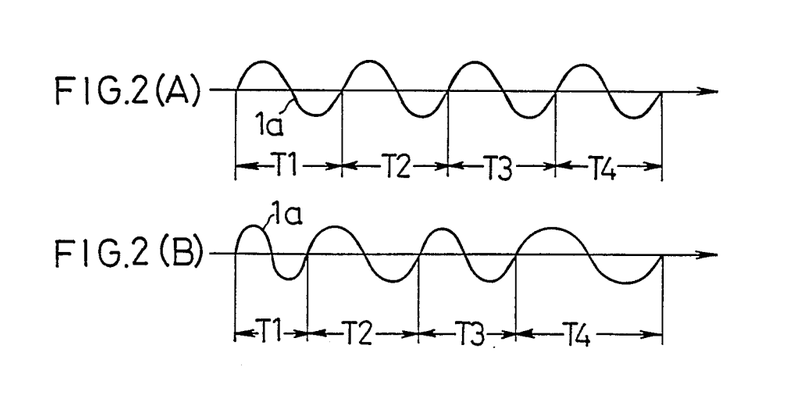
FIGS. 2(A) and 2(B) are waveform charts of output signals of a rotary sensor, respectively.

FIGS. 2(A) and 2(B) illustrate the waveforms of an output signal 1a of the rotary sensor 1.

FIG. 2(A) illustrates the waveforms of the output signal 1a on good roads. In FIG. 2(A), the periods $T_1$, $T_2$, $T_3$ and $T_4$ scarcely change from one another. This shows that the variation of vehicle speed is small.

FIG. 2(B) illustrates the waveforms of the output signal 1a on bad roads. In FIG. 2(B), the periods $T_1$, $T_2$, $T_3$ and $T_4$ change dramatically from each other. This shows that the variation of vehicle speed is large.

The output signal 1a of the rotary sensor 1 is converted into rectangular waveforms by the buffer amp. 2, and is inputted to the counter 3. The counter 3 counts the clock pulses inputted from the rising time of one rectangular wave to the rising time of the next rectangular wave, and transmits a period data X proportional to the period T of the output signal 1a. The period data X is inputted to the computer 4. The computer 4 detects the condition of the road surface using a procedure described later. The computer 4 is connected to a battery (not shown) through the key switch 5 and operates only when the key switch 5 is turned on.

Figure 3:
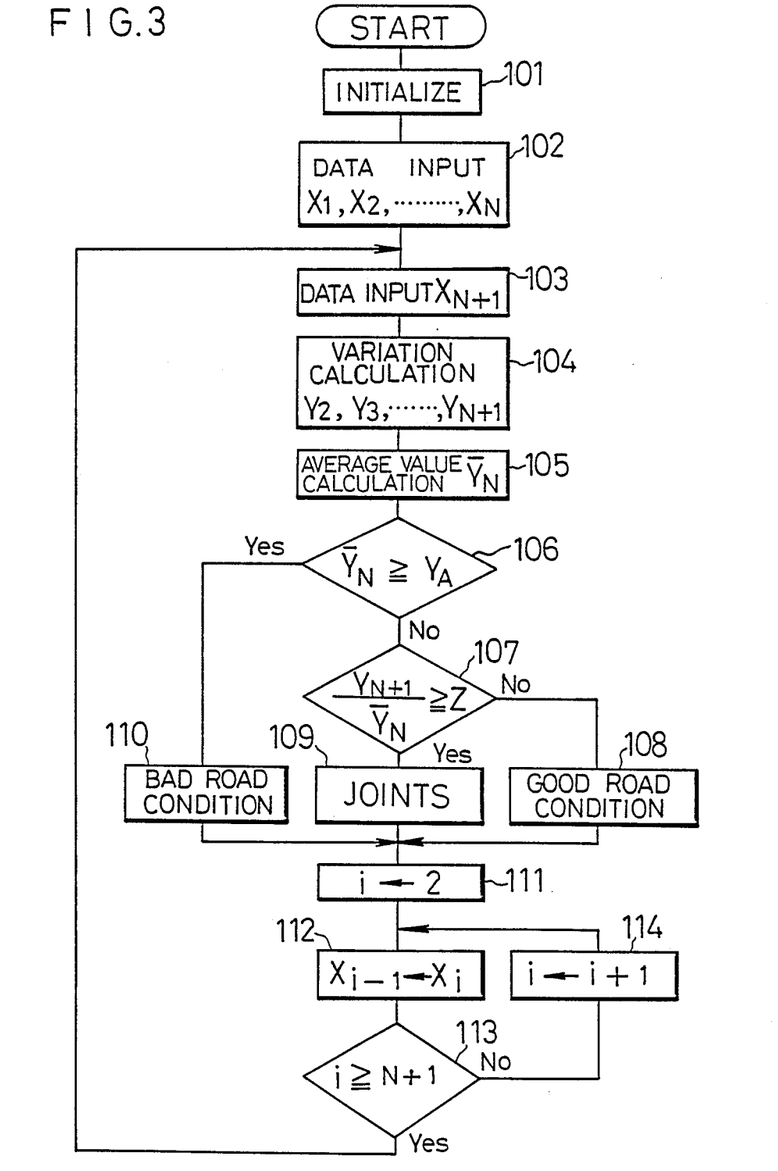
FIG. 3 is a program flowchart of a computer.

Hereinafter, the operation procedure of the computer 4 will be explained with reference to the flowchart of FIG. 3.

In the step 101, a memory is initialized and in the step 102, N period data $X_1, X_2, ---, X_N$ are continuously inputted. Then, in the step 103, (N+1)th data $X_{N+1}$ is inputted and in the step 104, the variation Yi of each of the data $X_1, X_2, --- X_N, X_{N+1}$ is calculated. This variation Yi is expressed by the following equation:

$$Yi = Xi - Xi - 1 (i = 2 \sim (N+1))$$

Figure 4A:
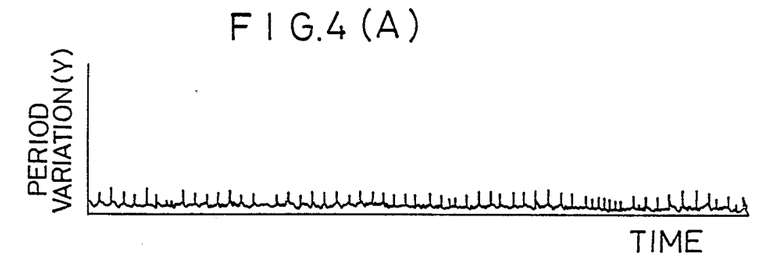
FIGS. 4(A), 4(B) and 4(C) are views, each illustrating the change of period variation of an output signal with the passage of time.
Figure 4B:
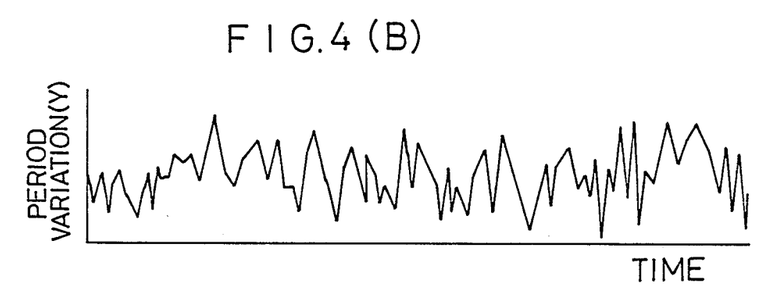
Figure 4C:
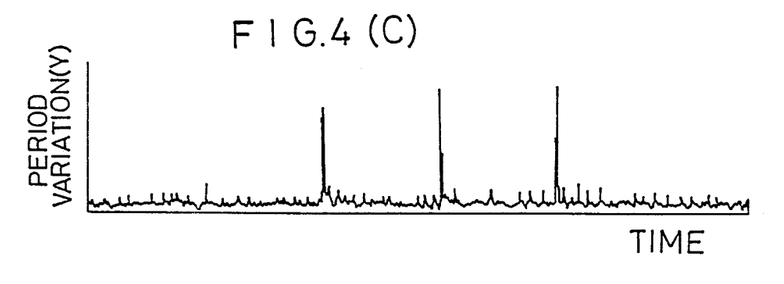

FIGS. 4(A) and 4(B) show the changes of variation Yi with the passage of time on good roads and bad roads, respectively, and FIG. 4(C) shows the change of variation Yi with the passage of time on good roads having joints thereon.

As is apparent from the drawings, the variation Yi is always small on the good roads and the variation Yi is always large on the bad roads. On the good roads having joints, the variation Yi becomes large only when a vehicle passes the joints.

The present invention takes notice of the above phenomena and calculates a deviation relation between the variation data. In this embodiment, the deviation relation is an average value $\overline{Y}_N Y_2, Y_3, --- Y_{N+1}$ in the step 105. This average value $\overline{Y}_N$ is expressed by the following equation:

$$\overline{Y}_N = (|Y_2| + |Y_3| + --- + |Y_{N+1}|/N)$$

The average value $\overline{Y}_N$ is large on the bad roads and is small on the good roads. By adjusting N to the proper value, the average value $\overline{Y}_N$ can be kept small without being affected by the joints.

In the step 106, the average value $\overline{Y}_N$ is compared with a predetermined value $Y_A$. When the average value $\overline{Y}_N$ is not less than a predetermined value $Y_A$, the road surface is determined as the bad road condition in the step 110.

In the step 107, the determination whether joints or good road condition is performed as follows. The variation $Y_{N+1}$, which is a variation between the newest period data $X_{N+1}$ and the just preceding period data $X_N$ is analyzed. $Y_{N+1}$ is divided by the average value $\overline{Y}_N$, and the obtained value is compared with a predetermined value Z.

When the obtained value is not less than the predetermined value Z, the road condition is determined as a joint, since $Y_{N+1}/\overline{N}_N$ dramatically changes when a vehicle passes the joint.

In the steps 111, 112, 113 and 114, the oldest period data $X_1$ is erased and the remaining data $X_2, X_3, ---, X_{N+1}$ are successively advanced.

In the above procedure, the bad road condition is firstly determined as joints and when the value $\overline{Y}_N$ becomes sufficiently large, correct determination as the bad road condition, is performed.

In the above procedure, the condition of the roads on which a vehicle runs can be accurately detected whether the good road condition, bad road condition or joints. This results in that the most adequate damping force of a suspension, for example, can be selected in accordance with the detected road condition.

In the first embodiment, the variation Yi is also affected by the acceleration and the of a vehicle. This effect will not cause problems if the sampling time of the period data X is made short.

In the first embodiment, the joints on good roads can be determined in the step 107. Therefore, by temporarily decreasing the damping force of the shock absorber when the vehicle passes the joints, and thereafter increasing the damping force for a while to speedily reduce rebound vibrations, a good ride can be maintained even when the vehicle passes the joints.

When the damping force of the suspension of a vehicle is controlled to be equal to that of the case that the vehicle runs on good roads, the above described detection of joints is unnecessary.

In the first embodiment, the periods of the output signal from the rotary sensor 1 are detected in place of the speed of a vehicle. In both cases, substantially the same result can be obtained.

The average value $\overline{Y}_N$ is changed with the increase of the vehicle speed. Therefore, it is preferable to change the predetermined value $Y_A$ in accordance with the vehicle speed.

The deviation relation can alternately be the standard deviation in place of the average value $\overline{Y}_N$. Especially when the variation Yi exhibits a normal distribution, the same result is obtained in both cases. However, when the standard deviation is used, calculations become complex. From the above reason, in the first embodiment, the standard deviation is not used.

In the step 107, $Y_{N+1}$ may be used in place of $Y_{N+1}/\overline{Y}_N$. However, $Y_{N+1}$ is liable to be affected by the kind of tires installed in a vehicle, or the like. Therefore, it is preferable to use $Y_{N+1}/\overline{Y}_N$.

Furthermore, the degree of roughness on bad roads and joints on good roads can be detected from the value $Y_{N+1}/\overline{Y}_N$, where N is the number of teeth in an integral number of rotations.

Figure 5:
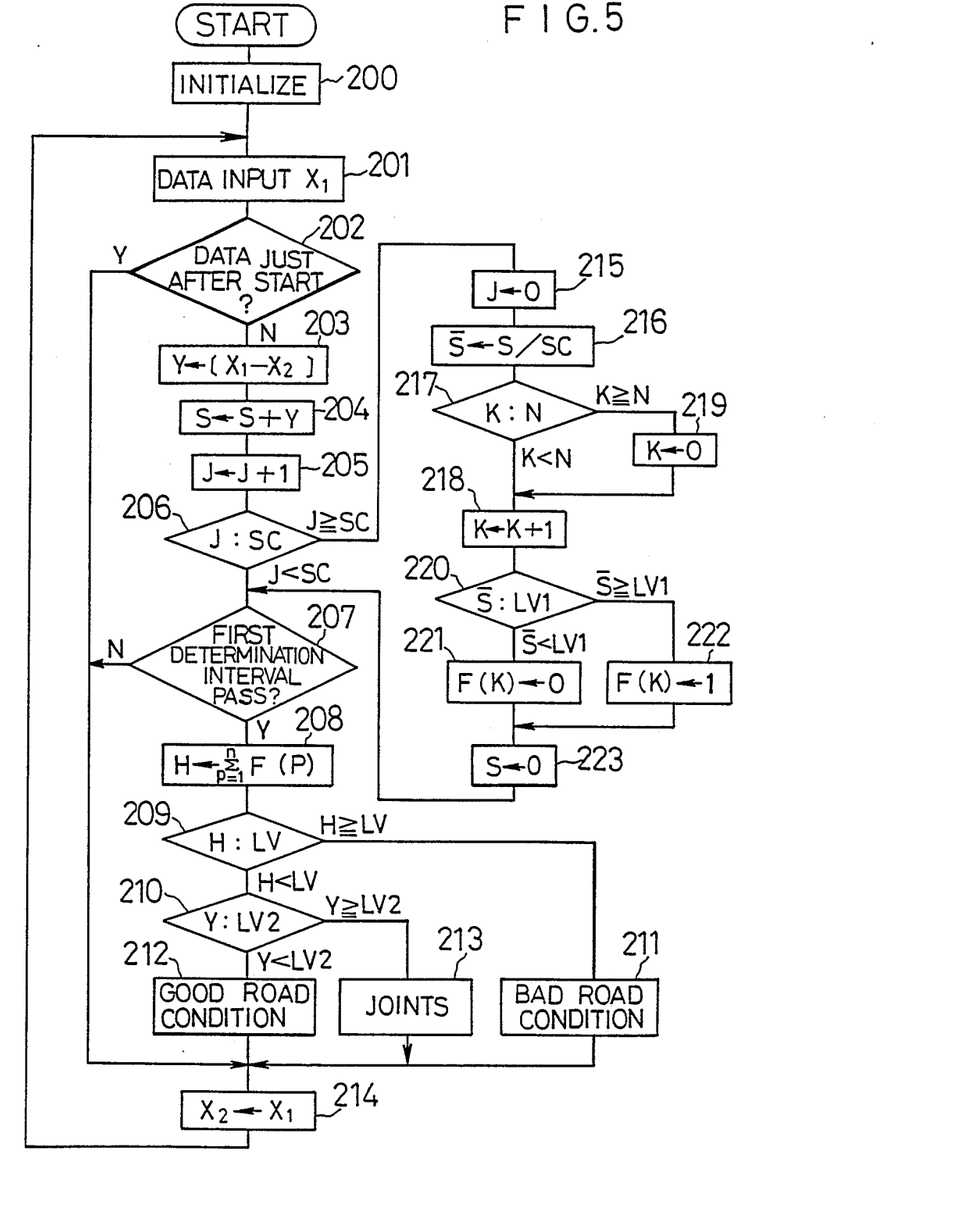
FIG. 5 is a program flowchart of a computer.
Figure 6:
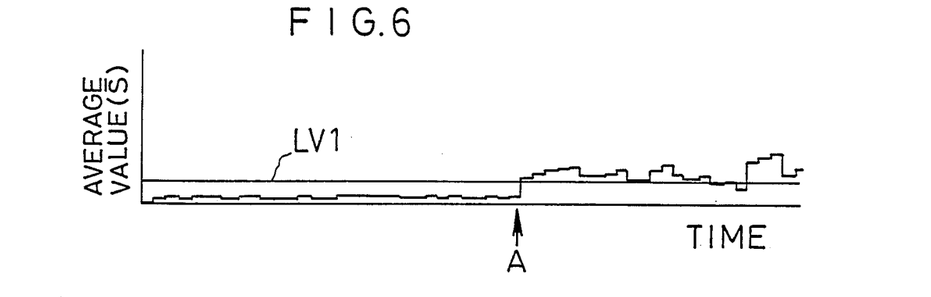
FIG. 6 is a view illustrating the change of average value of the period variations with the passage of time.
Figure 7:
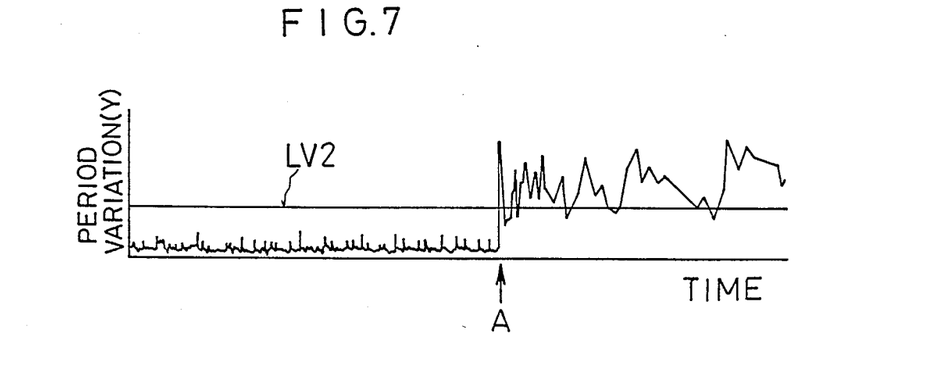
FIG. 7 is a view illustrating the change of period variation with the passage of time.

FIGS. 5 to 7 illustrate a second embodiment of the road condition detecting device according to the present invention. The hardware of the second embodiment is the same as that of the first embodimemt.

FIG. 5 shows the operation procedure of the computer 4 for this second embodiment.

In the step 200, a memory is initialized and in the step 201, the period data $X_1$ is inputted. Then, in the step 202, the period data $X_1$ inputted in the step 201 is checked to determine whether it is data inputted directly after this program has started.

When the result of the step 202 is YES, the operation moves to the step 214. In the step 214, the data $X_1$ is stored in the memory $X_2$ and the operation returns to the step 201. When the result of the step 202 is NO, the variation Y is calculated in the step 203 by using the equation $Y = |X_1 - X_2|$.

In the step 204, a plurality of the variations Y obtained in the step 203 are added.

In the step 205, the number of additions in the step 204 is counted by using a flag J and in the step 206, the flag J is compared with a constant value SC. In the case of J≧SC, the operation moves to the step 215 and in the case of J<SC, the operation moves to the step 207.

In the step 215, the flag J is cleared and in the step 216, the value S obtained by adding the variations Y SC times is divided by the constant value SC to obtain an average value $\overline{S}$.

In the step 217, a flag K is compared with a constant value N. When K≧N, K is cleared in the step 219 and the operation moves to the step 218. When K<N, the operation moves to the step 118. In the step 218, the flag K is increased by 1.

In the step 220, the value $\bar{S}$ obtained in the step 216 is compared with a predetermined value $LV_1$. When $\bar{S} \geq LV_1$, $F(K)$ is set to 1 in the step 222 and when $\bar{S} < LV_1$, $F(K)$ is set to 0 in the step 221.

Then, in the step 223, S is cleared and the operation returns to the step 207.

The above described constant value SC is set to the number of teeth in an integral number of rotations. This can be a number the same as the number of teeth formed around a circular plate 11 to be detected by the rotary sensor 1 (a single rotation), or an integrally multiplied number thereof (an integral number of rotations).

In this case, the average value $\bar{S}$ is not affected by errors of production in the intervals between adjacent teeth of the circular plate 11.

The constant value N defines the travel distance required for correctly detecting the road condition.

FIG. 6 shows the relation between the change of the average value $\bar{S}$ with the passage of time and the predetermined value $LV_1$. In FIG. 6, the road surface is changed from a good road to a bad road at the time A.

In the step 207, the check is performed whether the first determination interval passes or not. When the result of the step 207 is NO, the operation moves to the step 214 and when the result of the step 207 is YES, the operation moves to the step 208. In this step 208, N of F(K), each being set to "1" or "0" in the above described steps 221 and 222, are added to obtain an added value H.

This added value H shows the number of times that the average value $\bar{S}$ of the variation Y exceeds a predetermined value $LV_1$ in the above described determination interval.

In the step 209, the added value H is compared with a predetermined value LV. In the case of $H \geq LV$, the determination of bad road conditions is performed in the step 211. In the case of $H < LV$, the determination of joints is performed in the step 210.

The joints of roads must be determined very quickly. Therefore, the variation Y is compared with a predetermined value $LV_2$. When $Y < LV_2$, the determination of joints is performed in the step 213. When $Y < LV_2$, the determination of the good road conditions is performed in the step 212.

Then, the operation moves to the step 214.

FIG. 7 shows the relation between the change of period variation Y with the passage of time and a predetermined value $LV_2$. In FIG. 7, the road surface is changed from a good road to a bad road at the time A.

By repeating the above procedure, the road condition of roads on which a vehicle runs can be accurately detected. Therefore, the most suitable damping force of the suspension, for example, can be selected in accordance with the detected road condition.

In this case, at the start of the bad road, the condition of the road surface is determined as joints for a while. When the value of H increases, the accurate determination of the bad road condition is performed.

In this embodiment. the condition of the road surface is determined based on the frequency of the average value $\bar{S}$ exceeding the predetermined value $LV_1$. Therefore, even if the period variation Y is largely changed in the joints, the joints are not erroneously determined as the bad road condition.

The average value $\bar{S}$ and the variation Y are changed with the increase of the vehicle speed. Therefore, it is preferable to change the values $LV_1$ and $LV_2$ in accordance with the vehicle speed.

In the step 210, the value obtained by dividing the variation Y by the average value $\bar{S}$ can be used in place of the variation Y. This value is not affected by the kind of the tires to be installed in a vehicle, or the like.

What is claimed is:

1. A road surface detecting device for detecting a condition of a road surface on which a vehicle runs, comprising:
    (1) speed detecting means for detecting a speed of the vehicle at regular intervals of time;
    (2) speed variation calculating means, coupled to said speed detecting means, for repeatedly calculating a speed variation between successively detected speeds of the vehicle;
    (3) deviation calculating means for calculating a deviation between a predetermined number of said speed variations; and
    (4) determining means for: (a) determining the road surface as a bad condition when said deviation is not less than a predetermined value, and determining the road surface as a good condition when said deviation is less than said predetermined value and (b) determining the road surface as a rough area on a good road when said deviation is less than said predetermined value and a newest speed variation which has been most recently calculated is not less than a predetermined speed variation.

2. A road surface detecting device for detecting a condition of a road surface on which a vehicle runs, comprising:
    (1) speed detecting means for detecting a speed of the vehicle at regular intervals of time;
    (2) speed variation calculating means, coupled to said speed detecting means, for repeatedly calculating a speed variation between successively detected speeds of the vehicle;
    (3) deviation calculating means for calculating a deviation between a predetermined number of said speed variations; and
    (4) determining means for: (a) determining the road surface as being a bad condition when said deviation is not less than a predetermined value, and determining the road surface as a good condition when said deviation is less than said predetermined value and (b) determining the road surface as a rough area on a good road when said deviation is less than said predetermined value, and a value obtained by dividing a newest speed variation, which has been most recently calculated, by said deviation is not less than a second predetermined value.

3. A road surface detecting device for a vehicle including a circular plate coupled to an axle of the vehicle to rotate with said axle, with a plurality of teeth around an outer periphery thereof, comprising:
    (1) rotary sensor means, for detecting a passage of said teeth and outputting an output signal which has a transition in state every time one tooth passes said sensor means;
    (2) variation calculating means for calculating a variation of a time between said transition in state of said output signal;
    (3) deviation calculating means for calculating a deviation between successive ones of said variations calculated by said variation calculating means, wherein each said variation is a time difference between an integer number of complete rotations of said circular plate; and (4) determining means for determining a road surface as a bad condition when the deviation is not less than a predetermined value and determining said road surface as a good condition when the variation is less than the predetermined value, wherein said determining means determines the road surface as a rough area on a good road when said deviation is less than the predetermined value and a newest variation, which has been most recently calculated, is not less than a predetermined variation.

4. A road surface detecting device according to claim 3, wherein said deviation calculating means includes means for calculating an average value of said variations, and said determining means determines the road surface as said bad condition when the average value is not less than a predetermined average value and determines the road surface as said good condition when the average value is less than the predetermined average value.

5. An apparatus as in claim 3 wherein said deviation is a from the group consisting of an average of a plurality of said period variations and a standard deviation of said plurality of said period variations.

6. A device as in claim 3, said road surface detecting device further comprising said circular plate.

7. A road surface detecting device for a vehicle including a circular plate coupled to an axle of the vehicle to rotate with said axle, with a plurality of teeth around an outer periphery thereof, comprising:

(1) rotary sensor means, for detecting a passage of said teeth and outputting an output signal which has a transition in state every time one tooth passes said sensor means;

(2) variation calculating means for calculating a variation of a time between said transition in state of said output signal;

(3) deviation calculating means for calculating a deviation between successive ones of said variations calculated by said variation calculating means, wherein each said variation is a time difference between an integer number of complete rotations of said circular plate; and (4) determining means for determining a road surface as a bad condition when the deviation is not less than a predetermined value and determining said road surface as a good condition when the variation is less than the predetermined value, wherein said determining means determines the road surface as a rough area on a good road when both of (a) said deviation is less than the predetermined value and (b) a value obtained by dividing a newest variation, which has been most recently calculated, by said deviation, is not less than a second predetermined value.

8. A road surface detecting device for a vehicle comprising:

(1) speed detecting means for detecting a speed of the vehicle at regular intervals of distance;

(2) speed variation calculating means for repeatedly calculating a speed variation between successively detected speeds of the vehicle;

(3) average value calculating means for calculating an average value of a predetermined number of the calculated speed variations;

(4) frequency detecting means for detecting a number of times that said average value exceeds a predetermined average value in a predetermined travel distance; and (5) determining means for determining a road surface as a bad condition when said number of times is not less than a predetermined number and determining the road surface as a good condition when said number of times is less than the predetermined number, wherein said determining means determines the road surface as a rough area on a good road when said number of times is less than the predetermined value and a newest speed variation, which has been most recently calculated, is not less than a predetermined speed variation.

9. A road surface detecting device for a vehicle comprising:

(1) speed detecting means for detecting a speed of the vehicle at regular intervals of distance;

(2) speed variation calculating means for repeatedly calculating a speed variation between successively detected speeds of the vehicle;

(3) average value calculating means for calculating an average value of a predetermined number of the calculated speed variations;

(4) frequency detecting means for detecting a number of times that said average value exceeds a predetermined average value in a predetermined travel distance; and (5) determining means for determining a road surface as a bad condition when said number of times is not less than a predetermined number and determining the road surface as a good condition when said number of times is less than the predetermined number, wherein said determining means determines the road surface as a rough area on a good road when said number of times is less than a first predetermined value, and a value obtained by dividing the newest speed variation, which has been most recently calculated, by the average value, is not less than a second predetermined value.

10. A road surface detecting device for a vehicle including a circular plate connected to an axle of the vehicle so as to rotate about said axle, said circular plate having a plurality of teeth formed around an outer periphery thereof at regular intervals, comprising:

(1) a rotary sensor for detecting the passage of said teeth and outputting an output signal having a plurality of pulses, one pulse every time one tooth passes said rotary sensor;

(2) period variation calculating means for repeatedly calculating a variation of each period between said pulses of the output signal of said rotary sensor;

(3) average value calculating means for receiving a plurality of said variations, for an integer number of complete rotations of said circular plate, and for calculating an average value of the variations obtained in said integer number of complete rotations of said circular plate;

(4) frequency detecting means for detecting a number of times that said average value exceeds a predetermined average value in a predetermined running distance; and (5) determining means for determining a road surface as a bad condition when said number of times is not less than a predetermined value and determining a road surface as a good condition when said number of times is less than the predetermined value, wherein said determining means determines the road surface as a rough area on good roads when said number of times is less than a predetermined value and a newest period variation which has been most recently calculated is not less than a predetermined period variation.

11. A road surface detecting device for a vehicle including a circular plate connected to an axle of the vehicle so as to rotate about said axle, said circular plate having a plurality of teeth formed around an outer periphery thereof at regular intervals, comprising:
  (1) a rotary sensor for detecting the passage of said teeth and outputting an output signal having a plurality of pulses, one pulse every time one tooth passes said rotary sensor;
  (2) period variation calculating means for repeatedly calculating a variation of each period between said pulses of the output signal of said rotary sensor;
  (3) average value calculating means for receiving a plurality of said variations, for an integer number of complete rotations of said circular plate, and for calculating an average value of the variations obtained in said integer number of complete rotations of said circular plate;
  (4) frequency detecting means for detecting a number of times that said average value exceeds a predetermined average value in a predetermined running distance; and
  (5) determining means for determining a road surface as a bad condition when said number of times is not less than a predetermined value and determining a road surface as a good condition when said number of times is less than the predetermined value, wherein said determining means determines the road surface as a rough area on a good road when said number of times is less than a predetermined value and a value obtained by dividing a newest period variation which has been most recently calculated by the average value, is not less than a second predetermined value.

12. A road surface detecting device for detecting a condition of a road surface on which a vehicle runs, comprising:
  (1) speed detecting means for detecting a plurality of indications related to speed of the vehicle, at least one indication being detected at regular intervals of time;
  (2) speed variation calculating means for repeatedly calculating a speed variation between successively detected ones of said indications;
  (3) deviation calculating means for calculating a deviation between a predetermined number of said speed variations; and
  (4) determining means for determining the road surface as rough area on a good road when the deviation is less than a predetermined deviation and a newest calculated speed variation between a newest detected speed and its preceding detected speed is not less than a predetermined speed variation.

13. An apparatus as in claim 12 wherein said deviation is a calculation from the group consisting of (a) an average of a plurality of said variations and (b) a standard deviation of said plurality of variations.

14. A road surface detecting device for detecting a condition of a road surface on which a vehicle runs, comprising:

(1) speed detecting means for detecting an indication related to speed of the vehicle at regular intervals of time;
  (2) speed variation calculating means for repeatedly calculating a speed variation between successively detected indications;
  (3) deviation calculating means for calculating a deviation relation between a predetermined number of said speed variations; and
  (4) determining means for determining the road surface as a rough area on a good road when the deviation is less than a predetermined deviation and a value obtained by dividing a newest calculated speed variation between a newest detected speed and its preceding detected speed by the calculated deviation is not less than a predetermined value.

15. An apparatus as in claim 14 wherein said deviation is a calculation from the group consisting of (a) an average of a plurality of said variations and (b) a standard deviation of said plurality of variations.

16. A road condition detecting device for detecting a condition of a road surface on which a vehicle is running, comprising:
  means for detecting indications related to speed of said vehicle at first predetermined intervals of time; and processing means for:
  (1) determining accelerating of said vehicle based on said indications related to speed of said vehicle, said accelerations being determined at second intervals of time;
  (2) calculating a deviation between a plurality of said accelerations, said deviation being a calculation from the group consisting of an average or a standard deviation of said plurality of accelerations;
  (3) determining if a value indicative of said deviation is less than a predetermined threshold;
  (4) determining if the most recently calculated acceleration is less than an acceleration threshold;
  (5) determining said road which is being traversed as a rough spot on a good road when said deviation is less than said predetermined threshold and said most recently calculated acceleration is greater than said acceleration threshold;
  (6) determining said road as a good road if said deviation is less than said predetermined threshold and said most recently calculated acceleration is less than said acceleration threshold; and
  (7) determining said road as a bad road when said deviation is greater than said predetermined threshold.

17. A method for detecting a condition of a road surface, comprising the steps of:
  detecting indications related to a speed of said vehicle at first regular intervals;
  determining accelerations of said vehicle from ones of said indications related to speed of said vehicle at second regular intervals;
  determining a deviation between a plurality of said accelerations;
  determining if said deviation is less than a predetermined threshold;
  determining if a most recently determined one of said accelerations is less than an acceleration threshold;
  determining said road as a rough spot on a good road if said one of said accelerations is greater than said acceleration threshold and said deviation is less than said predetermined threshold;

determining said road as a good road if said deviation is less than said predetermined threshold and said acceleration is less than said acceleration threshold; and determining said road as a bad road if said deviation is greater than said predetermined threshold.

18. A method as in claim 17 wherein said deviation is calculated as one of average or standard deviation of said plurality of accelerations.

* * * * *